Figures 1, 2:
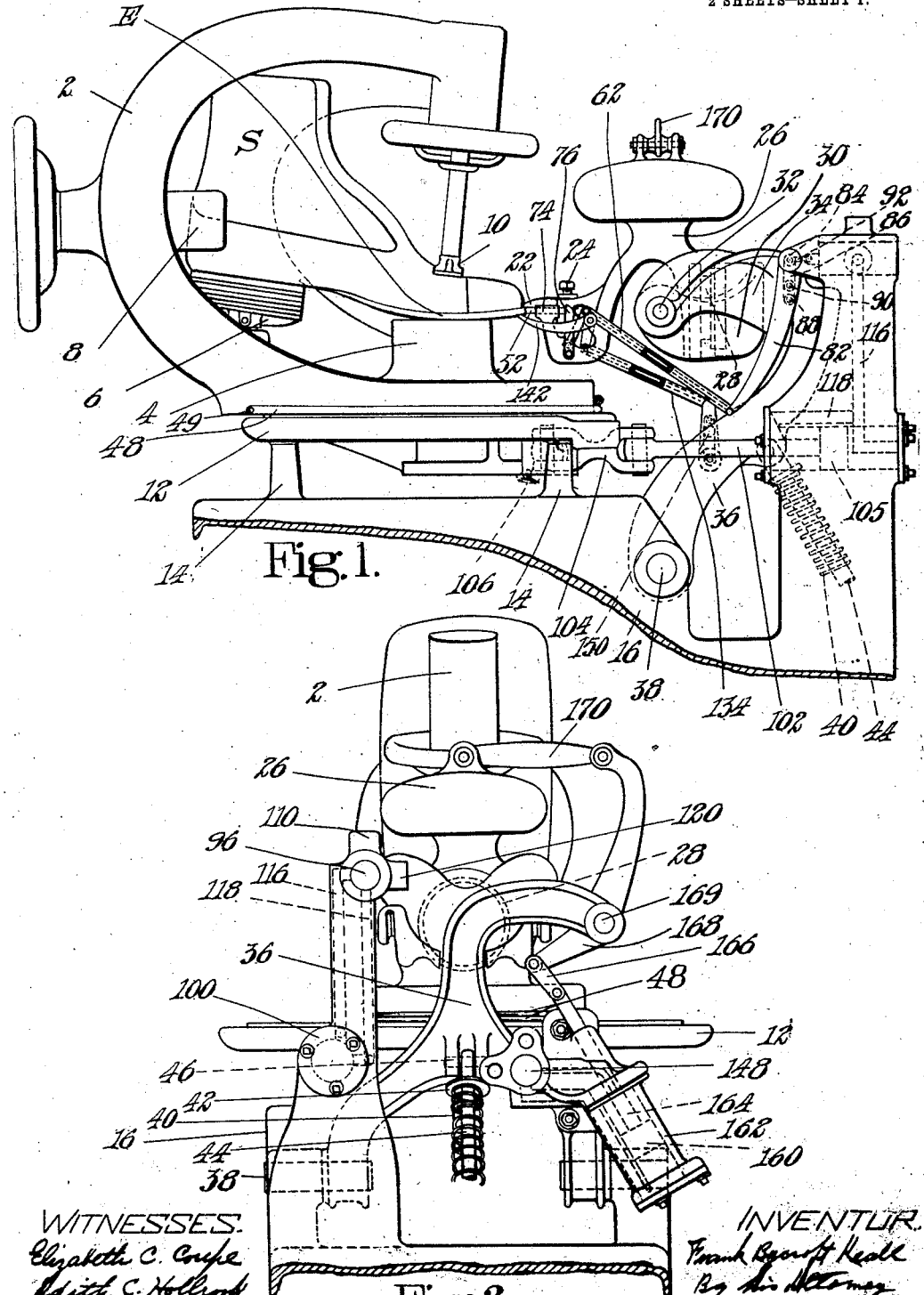

F. B. KEALL.
MECHANISM FOR CONTROLLING THE RELATIVE POSITION OF A TOOL AND WORK.
APPLICATION FILED SEPT. 28, 1908.

1,048,174.

Patented Dec. 24, 1912.

2 SHEETS—SHEET 1.

WITNESSES.

INVENTOR.

F. B. KEALL.
MECHANISM FOR CONTROLLING THE RELATIVE POSITION OF A TOOL AND WORK.
APPLICATION FILED SEPT. 28, 1908.
1,048,174.
Patented Dec. 24, 1912.
2 SHEETS—SHEET 2.
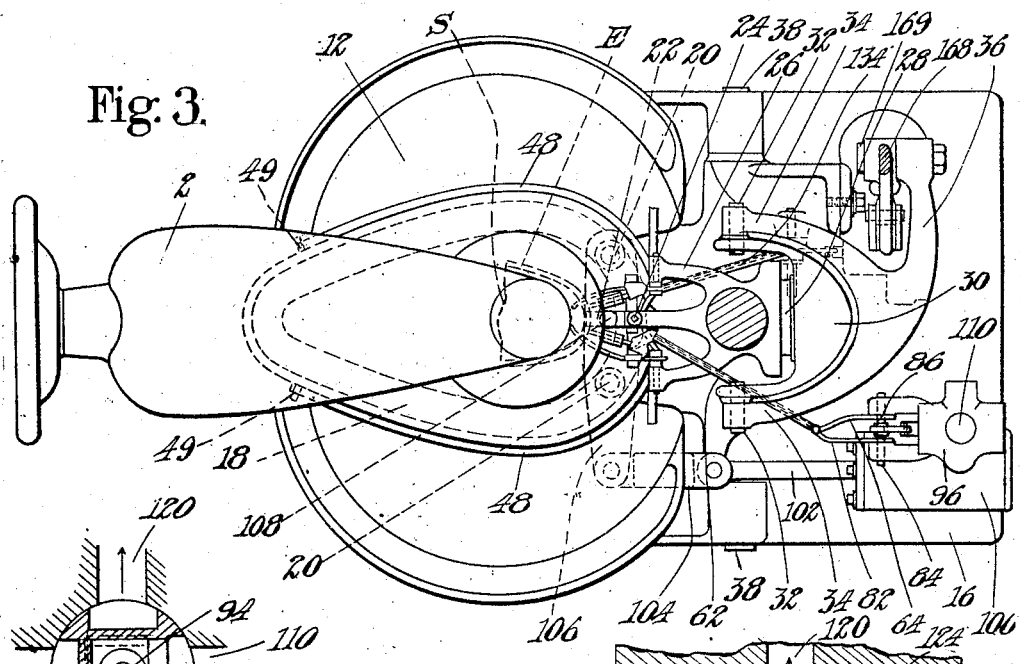
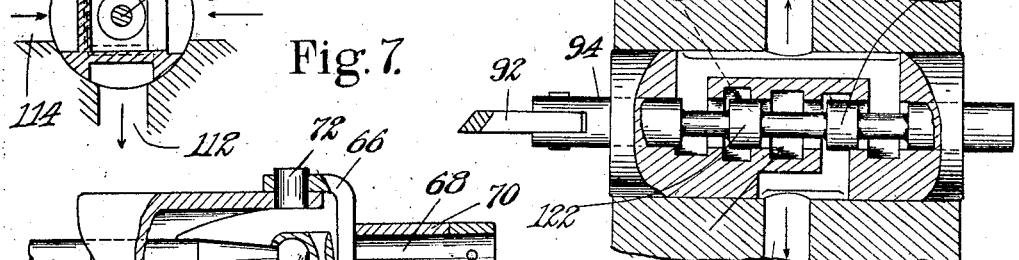
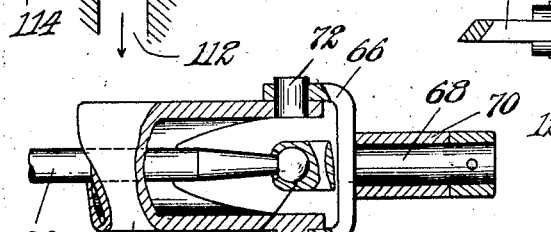
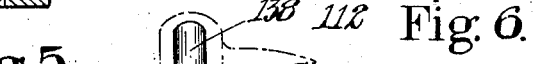
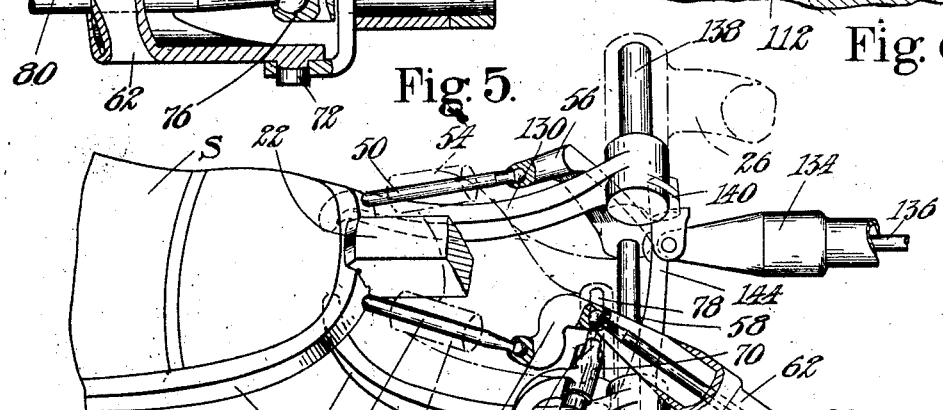

UNITED STATES PATENT OFFICE.

FRANK BYCROFT KEALL, OF LEICESTER, ENGLAND, ASSIGNOR TO UNITED SHOE MACHINERY COMPANY, OF PATERSON, NEW JERSEY, A CORPORATION OF NEW JERSEY.

MECHANISM FOR CONTROLLING THE RELATIVE POSITION OF A TOOL AND WORK.

1,048,174.　　　　　Specification of Letters Patent.　　Patented Dec. 24, 1912.

Application filed September 28, 1908. Serial No. 455,211.

*To all whom it may concern:*

Be it known that I, FRANK B. KEALL, a subject of the King of England, residing at Leicester, in the county of Leicester, England, have invented certain Improvements in Mechanism for Controlling the Relative Position of a Tool and Work, of which the following description, in connection with the accompanying drawings, is a specification, like reference characters on the drawings indicating like parts in the several figures.

This invention relates to machines of the general type in which a tool is caused to operate progressively along work and in which the relative position of tool and work during such operation is automatically determined according to changes in the curvature or general direction of some existing or desired contour of the work.

The invention is applicable specifically to machines wherein a tool and work are required to have relative movement in a path agreeing with an existing contour of the work or with a contour which is to be given to it or in a path which though not in precise agreement with the contour has a predetermined relation thereto.

A primary object of the invention is to provide a machine which while producing a high quality of work will be substantially automatic in operation or, at least, will require no considerable degree of skill on the part of the operator.

Hence, an important feature of this invention consists in providing a machine having means which acts automatically to maintain the tool and work approximately in the desired relation with mechanism for correcting the relative position of tool and work, *i. e.* for bringing these parts exactly or substantially into the desired relation. This feature of the invention may be embodied in a machine comprising guiding means which normally compels the relative movement of tool and work to conform to a path not possessing the desired contour or which brings these parts only approximately into the desired relation, in combination with additional adjusting or correcting means which modifies the action of said guiding means and thereby causes the path of relative movement to conform to said contour or maintains a predetermined relation of tool and work notwithstanding changes in contour.

Another important feature of the invention involves the combination of a correcting device or feeler (which may be a tool) that bears upon some contour of the work or upon some other pattern surface with a hydraulic, electrical or other power actuated mechanism controlled, but not driven by the feeler, for maintaining or obtaining the desired relation between tool and work. Ordinarily, when the work already has some permanent or basic contour, the feeler will directly engage that contour and the relative position of tool and work will correspond to such contour, but if the work has yet to be given such a contour the feeler will engage some other corresponding pattern surface. It is to be understood, therefore, that the terms "form", "pattern surface" and "contour" may apply to some portion of the work itself or to some external guide. Nevertheless, it is considered desirable to make use of some existing contour of the work as a form or guide where possible since in such case no special pattern or cam is required and the same machine with no substitution of parts and practically without adjustment can be employed for work varying considerably in style or size. Hence, the employment of a feeler arranged to engage a contour of the work is an important element of the preferred embodiment of the invention.

Preferably, though not necessarily, both work and tool are sustained and guided in their movements automatically for, while the traversing movement of the work with relation to the tool may be effected by hand, yet it is contemplated that the machine will usually be made entirely automatic in its action so that all movements will be effected and controlled through power actuated mechanism and so that no attention on the part of the operator will be required.

In one embodiment of the invention, for example, a work support may be moved by power, or otherwise, to carry the work progressively past the tool and during this movement the work support and tool may be shifted in and out with relation to each other by automatic adjusting mechanism in order to give a desired correction to the relative position of work and tool.

The invention is intended more particularly, however, for application in performing some operation in which it is desirable or necessary that the tool or the line of action or thrust thereof shall be maintained during such progressive movement substantially normal in one or more planes to the contour of the work or in some other definite angular relation thereto.

To this end, the invention comprises means controlled by the work or by a suitable pattern surface for swinging the work and tool relatively in one or more directions to effect this desired result. In the preferred embodiment of this feature of the invention, two or more feelers (of which one may be a tool or all may be tools) contacting with one or more pattern surfaces or forms are employed. As illustrated, each pair of feelers engages its own pattern surface, one feeler being a slight distance in advance of the other. These feelers, while not necessarily both movable, are so disposed or operated that changes in the curvature or general direction of the pattern surface passing them will by altering their relative position cause the adjusting mechanism controlled by them to effect an adjustment or correction of the relative position of work and tool so as to maintain the line of action or thrust of the tool in the normal or other relation above referred to. In the illustrated embodiment of the invention, the two feelers are both made movable in such a manner that a line joining their form engaging ends alters its direction with any alteration in the curvature or general direction of the pattern surface, while a member connected to the feelers likewise alters its position or direction and thereby controls adjusting mechanism which effects a relative angular adjustment between the work and the line of action of the tool. Where correction is required in more than one plane, a plurality of such correcting devices or feelers as have been hereinbefore mentioned, or of sets of such devices may be employed, one set of devices correcting the relative position in one plane and the other or others in one or more planes transverse thereto. Moreover, such correcting devices fitting or resting upon the work or other pattern surface so as to follow its angular deviations may, according to this invention, be so connected with the adjusting mechanism that their movement will effect the necessary relative adjustment of tool and work by turning the tool with relation to the work about an axis or about axes in a plurality of planes or about axes approximately parallel thereto and, by such turning, correction of compensation for small deviations of the work out of its general plane will be effected and thus the operating part of the tool will be maintained in its original relation to the face of the work, notwithstanding slight deviations thereof from its general direction.

One of the many particular constructions falling within the scope of the present invention, as already outlined, comprises a work support movable with relation to a tool, for example in a horizontal plane, over a plane supporting surface and controlled as to its path of movement by mechanism including two guiding points and automatic means for changing the relative position thereof in order to maintain a predetermined relation between tool and work support. In the illustrated embodiment of the invention, the work support is provided in its lower face with a cam groove which receives two studs secured to a pivoted lever. The cam groove is of such shape that the studs, if stationary, would determine the path of the work support as it is moved over its supporting surface and would maintain work and tool in approximately the desired relation but in order to correct such relative position of tool and work or to bring them into the exact relation desired, the lever carrying the studs is operatively connected with hydraulic or equivalent adjusting mechanism, the action of which is controlled, as by valves, from feelers which bear upon some pattern surface, such as the edge of a shoe sole or some other contour of the work. With such construction as the point of operation progresses along the work, the shape of the pattern surface will determine the relative positions of the two feelers. As one of them changes its position with reference to the other, the hydraulic mechanism will swing the pivoted lever carrying the two studs and will thereby shift the work support and change the normal path of work, work support and cam, all in relation to the tool, thus correcting or varying the guiding effect of the contour of the cam groove and bringing the path of relative movement into agreement with the existing or desired contour of the work.

Since this specific mechanism just described is capable of making the correction in one plane only, variations of the contour of the work from this plane are not compensated for by it. When, however, as in the case of the edge of a sole of a shoe, there are deviations in the contour from the general plane of the surface of the work, a pair of feelers will preferably be provided to bear against another contour of the work or pattern surface such as the tread face of the sole. This pair of feelers may likewise be connected to adjusting mechanism of the character already explained so that as this other contour changes its curvature or general direction a similar correction will be obtained; for example, the tool may be turned about its own axis so that its angular position will be changed to correspond with such second contour.

Another feature of the invention relates to the means for transmitting to the correcting mechanism the relative movement of the feelers. In carrying out this feature of the invention, the feelers are so supported and arranged that they may be moved together in and out without effecting any operation of the correcting mechanism but, whenever there is any relative movement between them, the correcting mechanism is thrown into operation. In the illustrated embodiment of this feature of the invention, there are provided a pair of levers arranged to swing about an axis coinciding with the normal or inoperative position of the free end of a differentially moved lever connecting said levers to a valve which directly controls hydraulic adjusting mechanism. When the feelers which are positively connected to the respective levers move together the valve will not be actuated but when they move with reference to each other the levers will be relatively moved and the valve will be opened and thus the correcting mechanism will be caused to operate.

While obviously the present invention, as above outlined, is not limited in the scope of its application to use in the performance of any particular operation upon work of a particular kind, yet it is intended more particularly for use in the manufacture of boots and shoes and especially in shaping or performing some other operation upon a shoe sole. For example, the invention may be employed in cutting out, trimming, or channeling soles, in turning or setting channel flaps, in burnishing or wheeling edges, or in sewing the inseam or the outseam of a welt shoe or the seam of a turned shoe. According to the particular class of work to be done, a correction of position, such as has been before referred to, may be required in one plane only or in several planes. It will be understood also that in performing these or other various operations, different well known operating tools will be employed. The present invention, however, does not involve the specific construction of such tools nor the mechanism which directly operates them since it is contemplated that these tools will perform upon the work substantially the same operations as are performed at present in non-automatic or only partially automatic machines, for as already indicated, the present invention relates primarily to mechanism for positioning the work relatively to a tool or a combination of tools as a whole. For this reason it is deemed superfluous to describe in the present specification the well known elements of the various machines to which the present invention may be applied.

Any one skilled in the art will be able to apply the principle of the invention to various types of machines now in use for performing any of the known operations above suggested, especially since the manner of applying the invention to a machine of one known type will now be set forth in greater detail. Hence, the term "tool" as employed in the specification and claims is intended to cover not only a single tool, such as an edge setting tool, but a combination of tools, such as those commonly used in forming stitches.

The present invention will now be described with the aid of the accompanying drawings as embodied in a machine for setting or burnishing the sole edges of boots or shoes.

In the drawings,—Figure 1 is a side elevation of the machine; Fig. 2 is an end elevation; Fig. 3 is a plan with the upper part of the tool holder removed; Fig. 4 is a perspective view of the edge setting tool and the correcting feelers, in operation upon the work, certain of the parts that would conceal other parts being broken away and the supports for the feelers being shown in broken lines, for the sake of clearness; Fig. 5 is a detail view of one of the connections, to be referred to, being substantially a section upon the line 5—5, Fig. 4; Fig. 6 is a longitudinal section in plan of one of the controlling valves for the hydraulic mechanism; and Fig. 7 is a central transverse section of the same. Figs. 4, 5, 6 and 7 are drawn to a scale that is larger than that to which Figs. 1, 2 and 3 are drawn.

The machine shown in the drawings in order concretely to illustrate the invention is of the general type disclosed in British Letters Patent No. 22003 of 1905, and No. 22034 of 1906. The illustrated machine comprises a work support 2 which is provided with abutments 4, 6 and clamps 8, 10 which may be adjusted by the operator for holding securely a boot or shoe S in place. This support 2 presents a lower plane surface slidable horizontally on a bearing plate 12 carried by pillars 14 extending from the machine frame 16. The work support 2 is controlled as to its path of movement upon the plate 12 by a cam groove 18 (Fig. 3) which is formed in the underside of the support and which coöperates with roll or other studs 20 that are supported and moved to control the position of the work support in a manner presently to be described.

The edge setting tool 22 (Figs. 1, 3 and 4) is adjustably secured by a bolt 24 in a tool holder 26 which is journaled at 28 to a carrier 30 so that it may turn about an axis that is normal to the acting surface of the tool. The carrier 30, in turn, is pivoted at 32 to arms 34 projecting forward from a lever 36 which is forked at its lower end (Fig. 2) where it is pivoted, at 38, to the frame 16. The tool 22 is provided with lips or projections which, as shown in Fig. 4, overlap the upper and lower surfaces of the projecting sole edge E of the shoe S and prevent the tool from slipping off the edge as the work support is moved to rub the work against the tool. The tool is kept up to the work by the action of a spring 40 in compression between a suitable abutment on the frame 16 and a collar 42 on a rod 44 pivoted at 46 to the lever 36. Although the lower end of the rod and this abutment are not shown in the drawings, the rod preferably extends through a hole in the said abutment and is provided with a collar or head which engages the lower side of the abutment thus limiting, in a well known manner, the forward movement of the tool toward the work support 2 when the shoe is removed therefrom.

In the embodiment of the invention illustrated, the work is carried progressively past the tool and it is contemplated that a rapid vibratory motion between sole edge and tool may also be provided, if desired, as is common in this class of machines. To this end, the work support 2 may be oscillated by hand or by any suitable power actuated mechanism. In the drawings, chains or belts 48, the respective ends of which are secured at 49 to opposite sides of the work support, are connected to some driving mechanism of any known or desired construction suitable for the purpose.

For the sake of clearness in explaining the construction of the mechanism for determining the exact relative positions of work and tool in a horizontal plane, let it be assumed that the sole of the shoe is flat and that when the shoe is secured upon the work support the sole occupies a horizontal position at substantially the working level of the tool. Under such conditions, it will be understood that as the work support 2 is oscillated to carry the work past the tool in opposite directions, the cam groove 18, which will be of the proper shape for the purpose, and rolls 20 will constrain the relative traversing movement of work support and tool to follow a path approximating in shape the contour of the work, while the forward and backward movements of the tool 22 under the action, respectively, of the spring 40 and the work will cause such relative movement to be in a path agreeing exactly in shape with the said contour. However, in some machines and particularly in an edge-setting machine, it is necessary that the work be so presented to the tool that the acting surface of the tool shall bear evenly (as far as the curvature of the contour permits) upon the work at all portions of the contour, that is to say, that the line of thrust of the tool shall remain substantially normal to the contour or at some other predetermined angular relationship therewith in all positions of the work while the successive parts of the work to be operated upon move past the tool. Furthermore, since as a matter of fact, the sole of a shoe is not flat but is curved somewhat, as is indicated, for example, in Fig. 1, it is necessary or highly desirable also that, during the progressive operation of the tool along the work, there be relative turning movement between the work and tool about an axis that is substantially normal to the acting surface of the tool. These two requirements are attained in the particular machine illustrated herein by the provision of two sets of correcting devices which bear upon the work, each set controlling the action of a hydraulic mechanism that acts, when the normal relationship of the work and the tool is disturbed, to reestablish the said relationship.

Dealing first with the correcting mechanism that acts to maintain the line of thrust of the tool in a horizontal plane normal to the work, it comprises two feelers 50, 52, one at each side of the tool as is shown in Fig. 4, which bear upon the sole edge E, against which they are pressed in any suitable or known manner, as by springs. The feeler 50 is slidable in a boss 54 (shown in broken lines Fig. 4) formed upon the tool holder 26 and is universally jointed at its end remote from the work with a lever 56 that is fixed on a rockshaft 58 journaled in bearings in the tool holder. Another lever 60, also fixed upon the rockshaft, is attached by connections such as are shown in detail in Fig. 5 to a hollow rod or tube 62 pivoted to a lever 64 (Fig. 3) that forms part of a controlling device for a hydraulic valve presently to be described. The connections between the lever 60 and the tube 62 comprise a yoke 66 which has a stem 68 journaled in a sleeve 70 at the end of lever 60, the yoke being pivotally mounted upon studs 72 projecting from the tube 62. The companion feeler 52, is likewise slidable in another boss 74 formed upon the tool holder 26 and is universally jointed at its end remote from the work with a lever 76 pivoted on a stud 78 in the tool holder. The lever 76 is connected by a universal joint to a rod 80 that connects it to a lever 82 which also forms part of the controlling device for the valve. For the sake of compactness the rod 62 is formed as a tube within which the rod 80 is received.

The valve-controlling device proper comprises the two levers 64, 82 pivoted co-axially at 84 on the machine frame, a small lever 86 (Figs. 1 and 3) disposed between said two levers and pivotally connected to the lever 64 at 88 and to the lever 82 at 90, which points of connection, as will be apparent, are situated at different distances from the axis 84 upon which the levers 64 and 82 swing. The upper end of the small lever 86 is connected by a link 92 to a valve spindle 94 of valve 96 at a point which coincides normally with the said axis 84. By this arrangement when the two levers 64 and 82 are swung by the action of the work upon the feelers 50 and 52 in the same direction through equal arcs, the small lever 86 will turn in company with them about the axis 84 and consequently no movement will be imparted to the valve 96. When, however, there is relative movement between the levers 64, 82 owing to a movement of one feeler with reference to the other, which occurs when one feeler moves to a greater extent than its companion by reason of changes in the contour or general direction of the work or other form, the small lever 86 will be turned in relation to the levers 64 and 82 so as to move its upper end and with it the valve 96 forwardly or backwardly according to the relative displacement of the levers 64, 82, thereby controlling the passage to or from a hydraulic cylinder 100 of the oil or other fluid that actuates a piston 105 therein. It will be apparent that owing to the relative positions of points 84, 88 and 90 a small relative displacement of the levers 64, 82 will effect a relatively larger movement of the valve 96 and thus render the adjusting mechanism sensitive to small variations in the contour of the work. The hydraulic cylinder 100 is formed in or secured to the machine frame and its piston rod 102 is connected by a link 104 to a lever 106 that is pivoted at 108 to the bearing plate 12 and supports the studs 20 hereinbefore referred to as engaging the cam groove 18 in the work support 2.

The valve, which as shown in Figs. 6 and 7 is of the piston type, is provided with an inlet opening 110 for the fluid from the source of supply, two openings 112, 114 leading respectively by passages 116 and 118 (Figs. 1 and 2) to the opposite sides of the piston 105 of the cylinder 100 and a fourth opening 120 leading to the exhaust or an oil reservoir. Two pistons 122, 124 on the valve spindle 94 coöperate with the valve openings in a known manner, the direction of the passage of the fluid in one position of the valve being indicated by arrows in Figs. 6 and 7.

The operation of this portion of the machine is as follows: When the feelers 50, 52 and the tool 22 occupy a position similar to that in which they are shown in Fig. 4, that is to say, a position in which the line of thrust of the tool 22 is substantially normal to the contour of the edge E and in particular to a line joining the points at which the two feelers engage the edge, the valve 96 occupies its central position which is somewhat to the left of the position shown in Fig. 6. At such time, the passages 116, 118 leading to the cylinder 100 are cut off by pistons 122, 124 from the supply and from the exhaust, so that no movement of the piston 105 in the cylinder is permitted but when the feelers 50, 52 are moved relatively to one another by a variation in the curvature of the work or general direction of the contour passing the tool, the levers 64, 82 which are connected to the feelers, will likewise be moved relatively and thus, through the small lever 86, will actuate the valve 96 and cause the piston 105 of the cylinder 100 to be set in motion. This movement of the piston will swing the lever 106 about its pivot 108 and as the work support 2 is controlled in position by the studs 20 on lever 106 and by cam groove 18, the work support 2 also will be swung until the edge of the work returns the feelers 50 52 to their normal position and the upper end of the small lever 86 to central position when the valve 96 will again be shut and the movement of the piston 105 stopped. Thus the feelers 50, 52 which will preferably be arranged relatively close together one in advance of the other upon the same pattern surface or form, especially where a high degree of sensitiveness or accuracy in the correction is desired, tend always to maintain the line of thrust of the tool 22 in a horizontal plane substantially normal to that part of the contour of the work immediately opposite the tool.

The mechanism which effects the relative turning movement of the tool 22 and the work about an axis that is normal to the acting surface of the tool, comprises elements that are similar in construction and mode of operation to those already described in connection with the mechanism for maintaining the line of thrust of the tool normal to the contour of the work and hence the description or illustration of this mechanism in detail would involve needless repetition. However, this mechanism will now be set forth briefly as follows: A feeler 130 is connected to the outer one 134 of two concentric connecting rods 134, 136 (similar to rods 62, 80 already described) by means of a rockshaft 138, to which the feeler is secured and which is journaled in the tool holder 26 and by means of an arm 140 on the shaft 138 connected to said rod 134 while a second feeler 142 is connected to the inner one 136 of the said concentric rods by an arm 144 on a rockshaft 146 journaled in the tool holder 26 to which rockshaft the feeler 142 is secured. As in the case of the mechanism first described, these concentric rods are connected to a valve 148 (Fig. 2) by a system of levers that is indicated generally at 150 in Fig. 1 and is or may be exactly similar to the system including the levers 64, 82 and 86 above described. The valve 148 controls the action of a piston 160 of a hydraulic cylinder 162 the piston rod 164 of which is connected by a link 166 with an elbow lever 168 pivoted at 169 on the lever 36 and coupled by another link 170 to the tool holder 26. The valve 148, lever system 150 and cylinder 162 are all carried upon the lever 36 in order that the oscillations of the latter shall not disturb their working relationship.

The operation of the feelers 130, 142 and the parts controlled by them is substantially the same as that of the adjusting mechanism including the feelers 50, 52. Briefly described it is as follows: The feelers 130, 142 as shown in Fig. 4, bear upon the underside of the sole of the boot S near the sole edge E, and any relative movement of the feelers due to alterations in relative height or level of the part of the contour of the work engaged by them will, through the connections between them and the valve 148, cause the latter to be shifted so as to effect a movement of the piston 160 in the cylinder 162. The moving piston, through the connections 164, 166, 168, 170, oscillates the tool holder 26 and the tool 22 about the axis of journal 28 until the tool is moved to its proper position in relation to the sole edge E when the feelers 130, 142 will likewise be returned to normal position and will shut the valve 148 to stop the movement of the piston 160 until another alteration of the level of the contour disturbs the relationship of the feelers 130, 142.

Although in order to describe fully one embodiment of the invention, a machine for burnishing or setting sole edges has been described in considerable detail, it must be clearly understood that the present invention is not, as already indicated, to be considered as limited in its application to an edge setting machine nor to the particular construction herein described since it may be embodied in other types of machines and in many other constructions without departing from the spirit and scope of the invention as defined in the claims.

Having thus indicated the nature and scope of the invention and having likewise explained how it may be embodied in a particular machine, what I claim as new and desire to protect by Letters Patent is:—

1. A machine in which a tool is caused to operate progressively along work, comprising means constructed and arranged to constrain the tool and work to assume successively predetermined relative positions, in combination with mechanism which may be rendered active automatically to correct or vary the operation of said means.

2. A machine of the class described having, in combination, an operating tool, means for guiding the relative movement of the tool and work, and correcting means including a feeler constructed and arranged continuously to engage a pattern surface, and means controlled thereby to maintain the tool in a predetermined angular relationship to the work.

3. A machine in which a tool is caused to operate progressively along work comprising in combination means for supporting the work, means for producing relative movement of the tool and work, and additional means continuously operative during the operation of the tool on the work to effect such relative movements of the tool and work that they will be maintained in a predetermined relationship to each other in a plurality of planes.

4. A machine of the class described, comprising means for sustaining the work and an operating tool relatively movable to carry the point of operation progressively along the work, guiding means acting normally to determine the successive relative positions of said sustaining means and tool in combination with additional means controlled by the work for correcting or varying the effect of said guiding means.

5. A machine of the class described, comprising a work support, an operating tool, means for moving said support and tool automatically with relation to each other, guiding means acting normally to determine approximately the relative position of said support and tool according to a desired contour of the work, in combination with additional means engaging said contour for correcting or varying the operation of said guiding means.

6. A machine of the class described having, in combination, a tool, a work support, means for producing relative movement of said tool and support to transfer the point of operation of the tool along the work, and correcting mechanism acting through said means to correct the angular relation of the tool and the work, said mechanism including a feeler engaging the work, and connections through which the mechanism is rendered active by variations in the position of the feeler as its point of engagement is transferred along the work.

7. A machine of the class described having, in combination, a tool, means for relatively moving the tool and the work to transfer the point of operation of the tool along the work, and correcting mechanism acting through said means to correct the angular relation of the tool and work, said mechanism including a form engaging feeler, and connections through which said mechanism is rendered active by variations in the position of the feeler as its point of engagement is transferred along the form.

8. A machine in which a tool is caused to operate progressively along the work, comprising means constructed and arranged to constrain the tool and work to assume successively predetermined relative positions, in combination with work controlled mechanism which may be rendered active automatically to correct or vary the operation of said means.

9. A machine in which a tool is caused to operate progressively along the work comprising, in combination, means for producing relative movement of the tool and work, a plurality of devices engaging the work and arranged to be moved thereby relatively to the tool, and means constructed and arranged to be set in operation by the movement of said devices to effect such relative movement of the tool and work that the normal relationship of said devices to the tool will be restored.

10. In a machine of the class described, a work support, a tool constructed and arranged to operate upon the sole of a shoe, means including a feeler engaging a contour of the sole and hydraulically actuated mechanism controlled thereby for determining the relative position of sole and tool.

11. A machine of the class described, comprising a work support and an operating tool, in combination with mechanism for swinging one of these parts with relation to the other including continuously operative correcting means comprising a form engaging feeler and power actuated mechanism controlled thereby.

12. A machine of the class described, comprising a work support and an operating tool, in combination with mechanism for swinging one of these parts to maintain the tool in predetermined angular relation with the work including continuously operative correcting means comprising a feeler and hydraulic mechanism controlled thereby.

13. A machine in which a tool is caused to operate progressively along work, having, in combination, a work support and an operating tool relatively movable, and controlling mechanism therefor, including two guiding members, automatic means for changing the positions of said members, and means operated by said members to constrain the said support and tool to maintain a predetermined relation notwithstanding variations in the contour of the work.

14. A machine in which a tool is caused to operate upon work along a definite contour, having, in combination, a work support and an operating tool relatively movable, a guide, said support and guide being provided one with a cam groove and the other with two guiding members co-acting with the groove, and means for swinging the guide to maintain the desired relation between work and tool as the point of operation is transferred along the work.

15. A machine of the class described, comprising an operating tool, a plurality of feelers constructed and arranged to bear upon a form along a predetermined contour, in combination with power actuated mechanism controlled by the relative movement of said feelers to maintain the line of action of the tool in a predetermined angular relation to said contour.

16. A machine of the class described, comprising a tool for operating progressively along work, power actuated means for moving the work with relation to the tool, and controlling means therefor comprising a pair of feelers arranged to bear against a pattern surface and by their movement with relation to each other to cause the operation of the power actuated means.

17. A machine in which a tool is caused to operate progressively along work, comprising work positioning mechanism and controlling means therefor including a plurality of form engaging devices movable both relatively and together and constructed and arranged to become active to actuate the work positioning mechanism only upon their relative movement.

18. A machine in which a tool is caused to operate progressively along work, comprising a pair of feelers engaging a pattern surface, power actuated means for relatively moving work and tool, and controlling means therefor constructed and arranged to be actuated by the relative movement of the feelers but to be unaffected when the feelers move together.

19. In a machine in which a tool is caused to operate progressively along work, power actuated means for relatively moving work and tool, and controlling means therefor comprising a pair of feelers engaging a pattern surface, a pair of concentrically pivoted levers operatively connected with the feelers and movable respectively thereby, a secondary lever pivoted to said concentric levers at different distances from their axis, and a connection at a point normally in said axis from the secondary lever to the power actuated means.

20. In a machine of the class described, a work support and a tool constructed and arranged for operating upon the sole of a shoe, means for supporting the tool to permit it to move about an axis substantially normal to the edge of the sole, and positioning mechanism including means acting upon the face of the sole near its edge for turning the tool automatically about said axis.

21. A machine of the class described, a work support and a tool constructed and arranged for operating upon the sole of the shoe, a movable tool carrier in which the tool is mounted for movement about an axis substantially normal to the sole edge, means acting upon said carrier to maintain the tool constantly in engagement with the work, and positioning mechanism including means acting upon the face of the sole near its edge, and hydraulic mechanism controlled thereby and supported by the carrier for turning the tool automatically about said axis.

22. In a machine of the class described, a work support and an operating tool relatively movable in a plurality of directions, means for controlling the relative position of work and tool comprising a hydraulic cylinder and a piston therein, operative connections between the piston and the work support or tool, a valve controlling the movement of the piston, and a pair of feelers constructed and arranged to be moved with relation to each other through the varying contour of a pattern surface and thereby to shift the valve and correct the relative position of tool and work.

23. In a machine of the class described, an operating tool, a work support, means for guiding the relative movement of tool and work, and correcting means including a plurality of feelers constructed and arranged to engage respective pattern surfaces to maintain the tool in predetermined angular relation with the work in planes transverse to each other.

24. A machine of the class described, comprising an operating tool, a plurality of sets of devices engaging the work along different lines, the devices of each set being constructed and arranged to be moved relatively to each other by the work, in combination with mechanisms controlled by the relative movement of said devices to control the relation of work and tool in a plurality of planes transverse to each other.

25. In a machine of the class described, an operating tool, a pair of feelers engaging a contour of the work upon opposite sides of the tool, power actuated means for relatively moving work and tool, and connections between the feelers and the said means including a pair of concentric shafts universally jointed at their respective ends to the feelers and to the power actuated mechanism.

26. A machine in which a tool is caused to operate progressively along the work, comprising means constructed and arranged to constrain the tool and work to assume successively predetermined relative positions in combination with pattern controlled mechanism which may be rendered active automatically to correct or vary the operation of said means.

27. A machine in which the tool is caused to operate progressively along the work comprising, in combination, a work support, means for producing relative movement of the tool and work support to transfer the point of operation of the tool along the work, and means controlled by engagement with the work to relatively swing said tool and work support automatically to maintain at the point of operation a predetermined relationship of the tool and work in a plurality of planes.

28. A machine of the class described, comprising in combination, a work support, a tool constructed and arranged to operate upon a shoe, means, including a feeler, engaging a contour of the sole of the shoe and fluid pressure actuated mechanism controlled by said means for determining the relative position of shoe and tool.

29. A machine of the class described, comprising in combination, a tool constructed and arranged to operate progressively along work, guiding means acting normally to determine the successive relative positions of tool and work, and means simultaneously engaging a form at separated points for correcting or varying the effect of said guiding means.

30. A machine of the class described, comprising in combination, a work support, a tool constructed and arranged for operating upon the sole of a shoe, means supporting the tool to permit it to move about an axis substantially normal to the edge of the sole, and positioning mechanism, including means engaging the sole for turning the tool automatically about said axis.

In testimony whereof I have signed my name to this specification in the presence of two subscribing witnesses.

FRANK BYCROFT KEALL.

Witnesses:
  GRACE HOLMES,
  ARTHUR E. JERRAM.